US008120533B2

(12) United States Patent
Lo et al.

(10) Patent No.: US 8,120,533 B2
(45) Date of Patent: Feb. 21, 2012

(54) METHOD AND SYSTEM FOR DERIVING LOCATION INFORMATION FROM UTILITY LINES

(75) Inventors: Sherman Chih Lo, San Mateo, CA (US); Per Enge, Mountain View, CA (US); C. O. Lee Boyce, Jr., Studio City, CA (US); Nicolai V. Alexeev, San Carlos, CA (US); Dan Boneh, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 228 days.

(21) Appl. No.: 11/864,333

(22) Filed: Sep. 28, 2007

(65) Prior Publication Data
US 2008/0079631 A1 Apr. 3, 2008

Related U.S. Application Data

(60) Provisional application No. 60/847,818, filed on Sep. 28, 2006.

(51) Int. Cl.
*G01S 3/02* (2006.01)
*G01S 1/24* (2006.01)
*G01S 1/02* (2006.01)
(52) U.S. Cl. ........................ 342/464; 342/388
(58) Field of Classification Search .............. 342/459, 342/465, 463, 357.06, 387–391, 464
See application file for complete search history.

(56) References Cited

U.S. PATENT DOCUMENTS

| 4,656,463 | A | * | 4/1987 | Anders et al. | 340/573.4 |
|---|---|---|---|---|---|
| 5,018,165 | A | * | 5/1991 | Sohner et al. | 375/133 |
| 5,132,695 | A | * | 7/1992 | Dumas et al. | 342/461 |
| 5,363,425 | A | * | 11/1994 | Mufti et al. | 379/201.06 |
| 5,552,772 | A | * | 9/1996 | Janky et al. | 340/573.4 |
| 5,625,668 | A | | 4/1997 | Loomis et al. | |
| 5,740,048 | A | * | 4/1998 | Abel et al. | 701/200 |
| 5,812,086 | A | * | 9/1998 | Bertiger et al. | 342/357.06 |
| 5,815,114 | A | * | 9/1998 | Speasl et al. | 342/357.06 |
| 5,832,364 | A | * | 11/1998 | Gustafson | 455/14 |
| 5,986,547 | A | * | 11/1999 | Korver et al. | 340/500 |
| 6,151,480 | A | * | 11/2000 | Fischer et al. | 340/310.12 |
| 6,201,497 | B1 | * | 3/2001 | Snyder et al. | 342/357.06 |
| 6,369,707 | B1 | | 4/2002 | Neer | |
| 6,373,432 | B1 | * | 4/2002 | Rabinowitz et al. | 342/357.16 |
| 6,614,349 | B1 | * | 9/2003 | Proctor et al. | 340/572.1 |
| 6,717,509 | B1 | * | 4/2004 | Murphy | 340/10.1 |
| 6,961,660 | B2 | * | 11/2005 | Underbrink et al. | 701/213 |
| 7,064,654 | B2 | | 6/2006 | Berkman et al. | |

(Continued)

OTHER PUBLICATIONS

Scott, et al., *Using PGA to Enhance Data Security*, GPS World, Apr. 2003.

(Continued)

*Primary Examiner* — Thomas Tarcza
*Assistant Examiner* — Cassie Galt
(74) *Attorney, Agent, or Firm* — Crawford Maunu PLLC

(57) ABSTRACT

Location systems and methods are implemented using a variety of arrangements and methods. Using one such system location information is provided in response to a utility-line arrangement propagating signals that represent a wireless radio-frequency (RF) communication originating from one or more remote transmitters. The system includes a receiver circuit communicatively coupled and responsive to the utility-line arrangement. The system also includes a signal-processing logic circuit, communicatively coupled and responsive to the utility-line arrangement. The signal processing logic circuit is arranged to derive location information from characteristics of the signals that are indicative of a location of the receiver circuit relative to the remote transmitters.

29 Claims, 8 Drawing Sheets

U.S. PATENT DOCUMENTS

| | | |
|---|---|---|
| 7,170,445 B2 * | 1/2007 | Thiel et al. ............... 342/357.06 |
| 2004/0073597 A1 | 4/2004 | Caveney et al. |
| 2005/0164666 A1 * | 7/2005 | Lang et al. ................... 455/282 |
| 2005/0164675 A1 | 7/2005 | Tuulos et al. |
| 2006/0052090 A1 | 3/2006 | Behr et al. |
| 2006/0066450 A1 | 3/2006 | Jackson |
| 2006/0152404 A1 | 7/2006 | Fullerton et al. |

OTHER PUBLICATIONS

Scott, et al., *A Location Based Encryption Technique and Some of Its Applications*, ION NTM 2003, Jan. 22-24, 2003.

Scott, et al, *Location Based Encryption & Its Role in Digital Cinema Distribution*, ION GPS/GNSS 2033, Sep. 9-12, 2003.

* cited by examiner

METHOD AND SYSTEM FOR DERIVING LOCATION INFORMATION FROM UTILITY LINES

RELATED PATENT DOCUMENTS

This patent document claims the benefit, under 35 U.S.C. §119(e), of U.S. Provisional Patent Application No. 60/847,818 filed on Sep. 28, 2006 and entitled: "Method and System for Deriving Location Information from Utility Lines," which is fully incorporated herein by reference.

FIELD OF THE INVENTION

The present invention relates generally to approaches for deriving location information, and more specifically, to deriving location information from signals carried on utility lines.

BACKGROUND

Navigational devices and methods are used for a number of applications. One class of navigational devices determines a location by determining a position relative to one or more transmitters. For instance, a device can trilaterate its position by determining the distance from each of three or more transmitters. The intersection of the distances determines the position. Various other position determination methods can also be used.

Ideally, a navigational device would be available in all or most locations that the device is to be used, use existing transmitter systems and be accurate enough for the intended application. Two prominent transmitter systems are global-positioning-system (GPS) and long range navigation (LORAN). Both GPS and LORAN offer coverage over large areas and are relatively accurate; however, neither works particularly well in locations that tend to block the transmitter signal, such as indoors or in urban environments. Thus, GPS and LORAN are not-particularly well suited for such locations.

Indoor navigational applications have a number of potential uses, such as inventory tracking, location specific customization and location related security measures. Accordingly, there is a need for navigational devices that can function in indoor and urban locations using existing systems.

These and other issues have presented challenges to the implementation and design of navigation systems, including those involving indoor location determinations and similar applications.

SUMMARY

The claimed invention is directed to deriving location information from signals carried on utility lines. The present invention is exemplified in a number of implementations and applications, some of which are summarized below.

According to one example embodiment of the present invention, a system is implemented for providing location information in response to a utility-line arrangement propagating signals that represent a wireless radio-frequency (RF) communication originating from one or more remote transmitters. The system includes a receiver circuit communicatively coupled and responsive to the utility-line arrangement. The system also includes a signal-processing logic circuit, communicatively coupled and responsive to the utility-line arrangement. The signal processing logic circuit is arranged to derive location information from characteristics of the signals that are indicative of a location of the receiver circuit relative to the remote transmitters.

According to another embodiment of the present invention, a method is implemented for providing location information in response to a utility-line arrangement propagating signals that represent a wireless radio-frequency (RF) communication originating from one or more remote transmitters. The method includes the step of receiving the signals at a location. Another step involves deriving the location information from characteristics of the signals that are indicative of the receiving location relative to the remote transmitters.

According to another embodiment of the present invention, a system is implemented for providing location information in response to a utility-line arrangement propagating signals that represent a wireless radio-frequency (RF) communication originating from one or more remote transmitters. The system includes a receiver circuit communicatively coupled and responsive to the utility-line arrangement. The system also includes a signal-processing logic circuit, communicatively coupled and responsive to the utility-line arrangement. The signal processing logic circuit is arranged to derive location information from characteristics of the signals that are indicative of a location of the receiver circuit relative to the remote transmitters.

According to another embodiment of the present invention, a method is implemented for providing location information in response to a utility-line arrangement propagating signals that represent a wireless radio-frequency (RF) communication originating from one or more remote transmitters. The method includes the step of receiving the signals at a location. Another step involves deriving the location information from characteristics of the signals that are indicative of the receiving location relative to the remote transmitters.

According to another embodiment of the present invention, a system is implemented for providing location information in response to a utility-line arrangement propagating signals that represent a wireless radio-frequency (RF) communication originating from one or more remote transmitters. The system includes a receiver circuit communicatively coupled and responsive to the utility-line arrangement. The system also includes a signal-processing logic circuit, communicatively coupled and responsive to the utility-line arrangement. The signal-processing logic derives location information from characteristics of the signals that are indicative of a location of the receiver circuit relative to the remote transmitters. The signal-processing logic also derives location information from an input other than the utility-line arrangement.

According to another embodiment of the present invention, a system is implemented for providing location information in response to a utility-line arrangement propagating RF-based signals that represent a wireless radio-frequency (RF) communication originating from one or more remote transmitters. The system includes a transmitter circuit to introduce a mapping signal to the utility-line arrangement. The system also includes a receiver circuit communicatively coupled and responsive to the utility-line arrangement and a signal-processing logic circuit, communicatively coupled and responsive to the utility-line arrangement. The signal-processing logic circuit derives location information from characteristics of the RF-based signals that are indicative of a location of the receiver circuit relative to the remote transmitters. The signal-processing logic circuit also derives location information from a feedback signal resulting from the mapping signal.

According to another embodiment of the present invention, a system is implemented for providing location information in response to a utility-line arrangement propagating signals that represent a wireless RF communication originating from one or more remote transmitters. The system includes a receiver circuit communicatively coupled and responsive to the utility-line arrangement. The system also includes a signal-processing logic circuit, communicatively coupled and responsive to the utility-line arrangement. The signal-processing logic circuit derives location information from characteristics of the signals indicative of a location of the receiver circuit relative to the remote transmitters. The system also includes a control arrangement used to limit access to a device connected to the system in response to the location information.

According to another embodiment of the present invention, a system is implemented for tracking one or more electrical devices. The system includes a remote device for receiving location information from the electrical devices. The electrical devices provide location information in response to a utility-line arrangement propagating signals that represent a wireless RF communication originating from one or more remote transmitters. The electrical devices use a receiver circuit communicatively coupled and responsive to the utility-line arrangement, a signal-processing logic circuit, communicatively coupled and responsive to the utility-line arrangement and a tracking circuit arranged to provide the location information to the remote device. The signal-processing logic circuit derives location information from characteristics of the signals indicative of a location of the receiver circuit relative to the remote transmitters.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
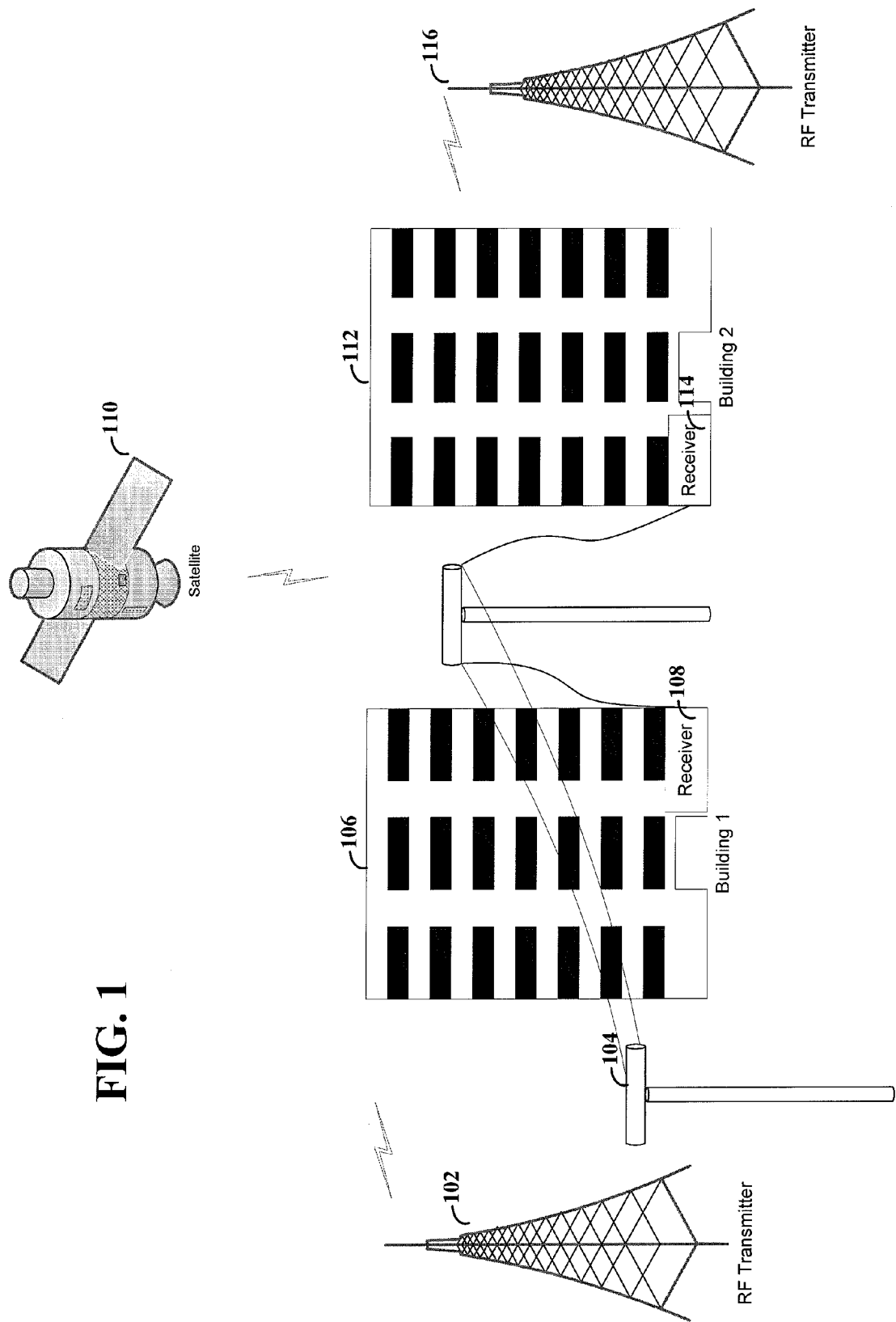
FIG. 1 shows a diagram of a navigational system, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be useful for a variety of different applications, and the invention has been found to be particularly suited for use in deriving location information from RF signals carried on utility lines. While the present invention is not necessarily limited to such applications, various aspects of the invention may be appreciated through a discussion of various examples using this context.

Consistent with one embodiment of the present invention, an arrangement is used to provide location information. The arrangement uses a utility line as an antenna used by a receiver circuit. The receiver circuit is capable of receiving one or more wireless-radio-frequency-transmission signals through the use of the utility line. The signals correspond to signals transmitted from one or more transmitters at remote locations. A location circuit derives location information from characteristics of the signals. The characteristics of the signals are indicative of the location of the receiver circuit relative to the remote locations corresponding to the transmitters.

Consistent with another embodiment of the present invention, location information is provided using a method that uses a utility-line arrangement propagating signals that represent a wireless radio-frequency (RF) communication originating from one or more remote transmitters. Using the method, the propagated signals are received at a receiving location. The location information is derived from characteristics of the signals, the characteristics being indicative of the receiving location relative to remote transmitters.

Consistent with another embodiment of the present invention, a utility line is used as an antenna for LORAN or similar RF signals. The utility line can be a power line or similar conductive line that can act as an antenna. A circuit determines the location of the receiver based upon the LORAN signal using known position determination techniques. Often a utility line provides power to an entire building or structure. For such a situation, the LORAN signals can be received at any point within the building by connecting to the supplied power. The characteristics of the received LORAN signals can then be used to determine the building location. This is particularly useful for locations within buildings for which LORAN and GPS signals are not otherwise able to be received.

It can be advantageous for position-dependent signals carried on the utility line to be accessible indoors to avoid significant degradation of the position-dependent signals. For instance, data carried by some communication based utility lines may make the retrieval of position-dependent signals more difficult, especially where additional data is transmitted at a frequency that corresponds to the position-dependent signals (e.g., telephone lines, cable television lines and other communication lines).

A filter circuit can be used to isolate the position-dependent signals from noise and other signals that might be present on the utility line. A receiver circuit translates the filtered signal to facilitate processing by another circuit. In one instance, the receiver circuit performs an analog-to-digital conversion using an analog-to-digital converter (ADC). The produced digital signal can then be processed by a location determination circuit. In another instance, the receiver circuit formats the signal for processing without using an ADC (e.g., signal amplification and analog filtering). A circuit then processes the signal from the receiver circuit to determine the location information.

The determination of the location information can be accomplished using a number of different methods. One such method is sometimes referred to as time of arrival and involves computing the arrival time of the signal relative to the transmission time. In one example of such a method, also known as time difference of arrival, signals received from multiple transmitters are synchronized to each other. Because the transmissions travel at a relatively constant speed, the receiver can determine the distance from each transmitter relative to the time each transmission is received (e.g., the longer the delay in receiving the transmission the further the transmitter is from the receiver). Another such method involves the use of signal strength. Because the signal strength is generally relative to the distance from the transmitter, the signal strength can be used to determine the distance from a transmitter. In some instances more elaborate techniques can be used, such as using a map of known signal strengths at various locations to determine location information. Yet another such method involves directional transmitters. The transmitters are configured to send a directional RF signal. Thus, a received signal is indicative of the direction the receiver is from the source transmitter.

Consistent with another example embodiment of the present invention, the location information can be used as a security signature. A system derives the security signature from location-dependent characteristics of the transmitted signals. The signature can be useful for a variety of applications, such as secure asset management. In one instance, the signature can be compared against a look-up table or used as a key for the decryption/encryption of data. Thus, the security signature does not need to be converted to geographic indicators, such as longitude and latitude. The signatures can be used in a variety of other uses. For example, additional methods for implementing location based encryption techniques are taught in the following appendices filed in the underlying provisional application, Appendix A entitled: "A Location Based Encryption Technique and Some of Its Applications," and Appendix B entitled: "Location Based Encryption & Its Role In Digital Cinema Distribution," which are fully incorporated herein by reference.

Turning now to the figures, FIG. 1 shows a diagram of a navigational system, according to an example embodiment of the present invention. FIG. 1 shows RF transmitters 102 and 116, utility line 104, buildings 106 and 112, receivers 108 and 114, and GPS satellite 110. Utility line 104 acts as an antenna for RF signals transmitted by RF transmitters 102 and 116. Receiver 108 and 114 process the signals on utility line 104 to determine the location of the receivers relative to RF transmitters 102 and 116 and/or one or more satellite transmitters 110.

In one instance, receivers 108 and 114 are located within buildings 106 and 112. In many buildings it is difficult or impossible to receive RF signals from LORAN, GPS, or other RF transmitters. Accordingly, utility line 104 facilitates the reception of the location dependent RF signals by receivers 108 and 114 using existing wiring.

RF transmitters 102 and 116 are shown as being tower based transmitters, however, one skilled in the art would recognize that the RF transmitters can be implemented using other types of transmitters, including satellite transmitters that are capable of sending RF signals that receivers 108 and 114 can recover from utility line 104.

Utility line 104 includes various types of electrical lines, such as power lines, telephone lines, cable television lines and other electrical lines. In a particular embodiment, utility line 104 is a power line and receivers 108 and 114 are connected to the power line through electrical outlets.

Receivers 108 and 114 use characteristics of the received signals to determine location information. A number of different methods can be used alone or in combination to determine the location information. A non-inclusive list of examples of such methods includes, range, angle, time of arrival, time difference of arrival and signal strength.

Time of arrival includes the process of determining the time the signal is received relative to the time the signal was to be transmitted. Because RF signals travel at a finite speed (e.g., the speed of light), the difference between the transmission time and receiving time corresponds to the distance between the transmitter and the receiver. In one example implementation of time of arrival, the receiver device includes a clock that is synchronized with the transmitter clock. In one instance, the synchronization can be accomplished by synchronization data that is sent as a part of the RF signal. The receiver circuit can estimate and correct for timing variances between the transmitter clock and the receiver clock based upon the synchronization data. Alternatively, if the clock circuits are accurate enough, the receiving device can be synchronized during an initial (or periodic) calibration without need for synchronization data in the RF signal. In yet another instance, a source external to both the transmitter and receiver can be used to provide timing or synchronization information.

Time difference of arrival is a comparison of the arrival time of RF signals transmitted from different transmitters. A specific example of time difference of arrival is used by many LORAN C navigational devices. In the case of LORAN, the RF transmitters are considered either slave (secondary) stations or master (primary) stations. The stations alternate transmitting RF signals and the receiver determines the delay between the signals received from each transmitter. The secondary stations each transmit an RF signal at a predetermined time after receiving an RF signal from a master station. In this manner, the secondary stations maintain synchronization with the master station and the receiver need not maintain a synchronized clock. Instead, the receiver can determine location information based upon the difference between the arrival of an RF signal from a master station and one or more secondary stations. For example, given two secondary stations, a curve that represents potential locations of the receiver can be identified based upon the the time difference between the master and a secondary station. The time difference between the master and another secondary station identifies another curve that intersects the first curve at potential location(s) for the receiver.

Angle methods generally rely upon directional transmitters or receivers instead of omni-directional transmitters. Thus, a receiver can determine the direction or angle from the transmitter because the signal will not be received unless the receiver is in the path of the directional signal. In a specific example, a transmitter sends an omni-directional signal having a first phase. A directional transmitter is rotated 360 degrees while transmitting a signal containing a phase offset from the omni-directional signal that corresponds to the current transmitting direction (i.e., the phase offset varies with the direction of the transmitted signal). A receiver uses the phase offset to determine the direction from the transmitter as the directional signal will only be received when the directional transmitter is aligned with the receiver. If two such transmitter stations are used, the intersection of the directional information can be used to determine the receiver's location. In another example, a directional receiver is used in a manner similar to that of the directional transmitter.

Signal strength (range) methods rely upon the strength of a received signal to determine the distance from the transmitter. In the simplest terms the signal strength is attenuated as a function of the distance from the transmitter. Thus, the distance from the receiver can be determined as a function of the signal strength received. Several factors complicate this determination. For instance, it is helpful for the receiver to know the actual transmission power radiated at the transmitter and not just the power output by the transmitter. It is also beneficial to know the propagation path of the signal due to interference from various sources.

In one embodiment of the present invention, signals produced by existing RF transmitters are used by the receivers 108 and 114. Two popular transmitter systems currently available are GPS and LORAN. Current GPS systems operate at frequencies in excess of 1000 MHz and are relatively low power transmissions. A specific type of LORAN signal, sometimes called LORAN C, operates at frequencies near 100 KHz. Such lower frequencies are particularly useful for detection by receivers 108 and 114 using a utility-line antenna.

In another embodiment of the present invention, RF transmitters can be specifically constructed for use with the receivers 108 and 114. For example, one or more local transmitters can be configured on or near buildings 106 and 112. Such RF transmitters can be constructed for use according to the various location determination methods.

Figure 2:
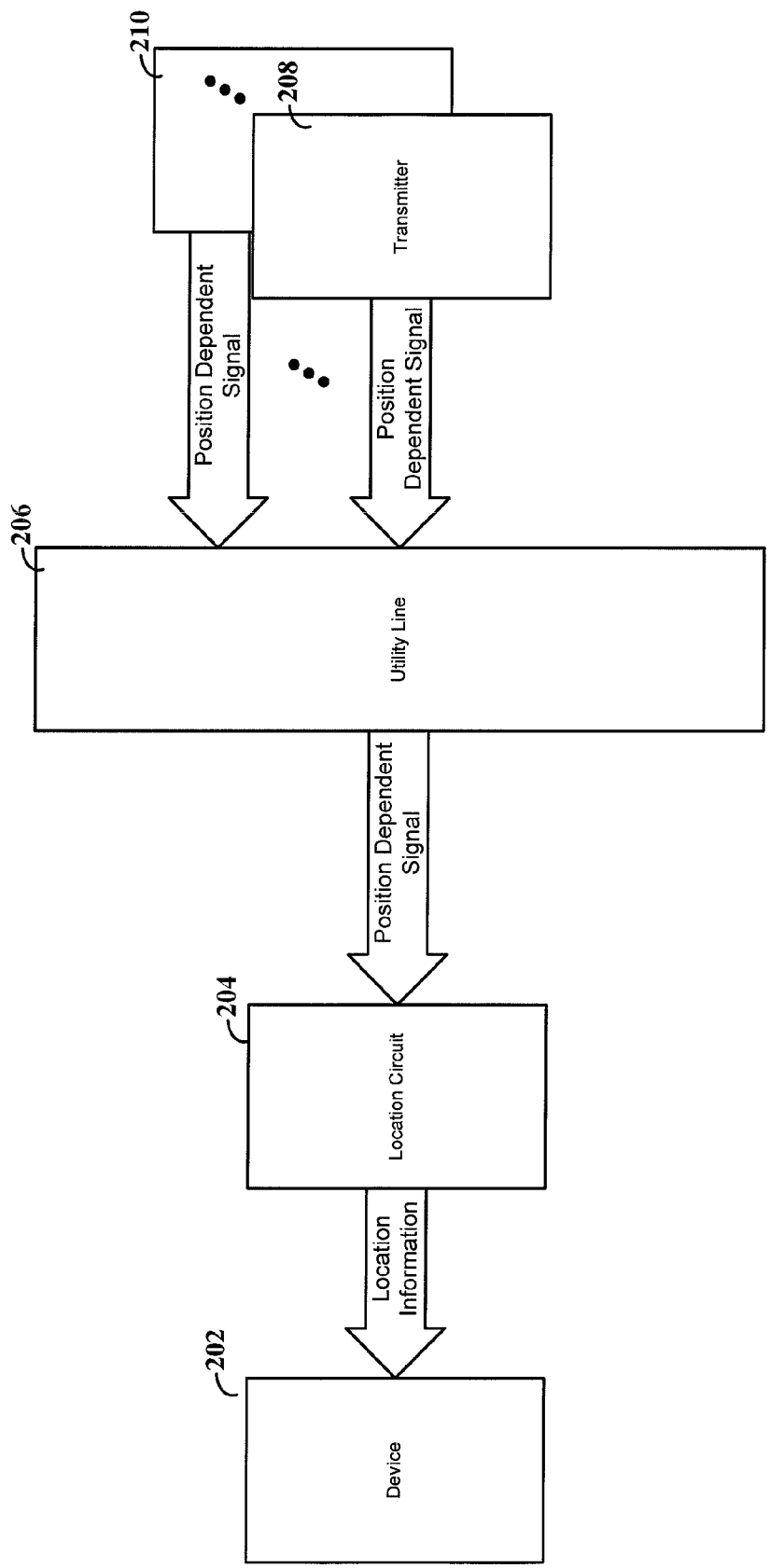
FIG. 2 shows a block diagram for a utility line navigational system, according to an example embodiment of the present invention.

FIG. 2 shows a block diagram for a utility line navigational system, according to an example embodiment of the present invention. The diagram includes transmitters 208 to 210, utility line 206, location circuit 204 and device 202. Transmitter 208 produces RF signals that are subsequently carried on utility line 206. The RF signals have position dependent characteristics, such as signal strength, directional information and propagation delay.

Location circuit 204 uses the position dependent signal carried on utility line 206 to determine location information. Location information can be a number of different types of information, such as distance from a transmitter, direction from a transmitter, latitude/longitude data points, elevation, street addresses and corresponding zip codes. Such information can be transmitted to and used by device 202. Device 202 can use the location information for a host of different uses, including (but not limited to) uses ranging from inventory management to security.

Location circuit 204 can be implemented using customized circuitry, a customized processor, a general purpose computer using specialized software, digital signal processors (DSPs), programmable logic arrays and combinations thereof. In one embodiment of the present invention, LORAN signals received on a power line are processed using a DSP, such as TMS320™ family of processors from Texas Instruments, Inc. Location information can be provided to device 202 using, for example, digital communications, analog communications and combinations thereof.

In one embodiment of the present invention, device 202 includes a processor arranged to use the location information. The processor may be part of a general purpose computer, handheld device, appliance, Internet protocol (IP) phone, or just about any device for which the location information can be useful. In one instance, the device may be customized to be responsive to the location information through the use of various software applications, including customizations related to security settings, Ethernet settings, display settings, different authorized user lists, tracking functions and site licenses. In another instance, a device can be customized to be responsive to the location information through the use of hardware and/or various software applications. According to another example implementation, a portable phone device, such as an IP phone, has emergency information updated in response to a change in the location information. This is particularly useful for meeting emergency telephone standards such as the National Emergency Numbering Association (NENA) E911 standards.

Figure 3:
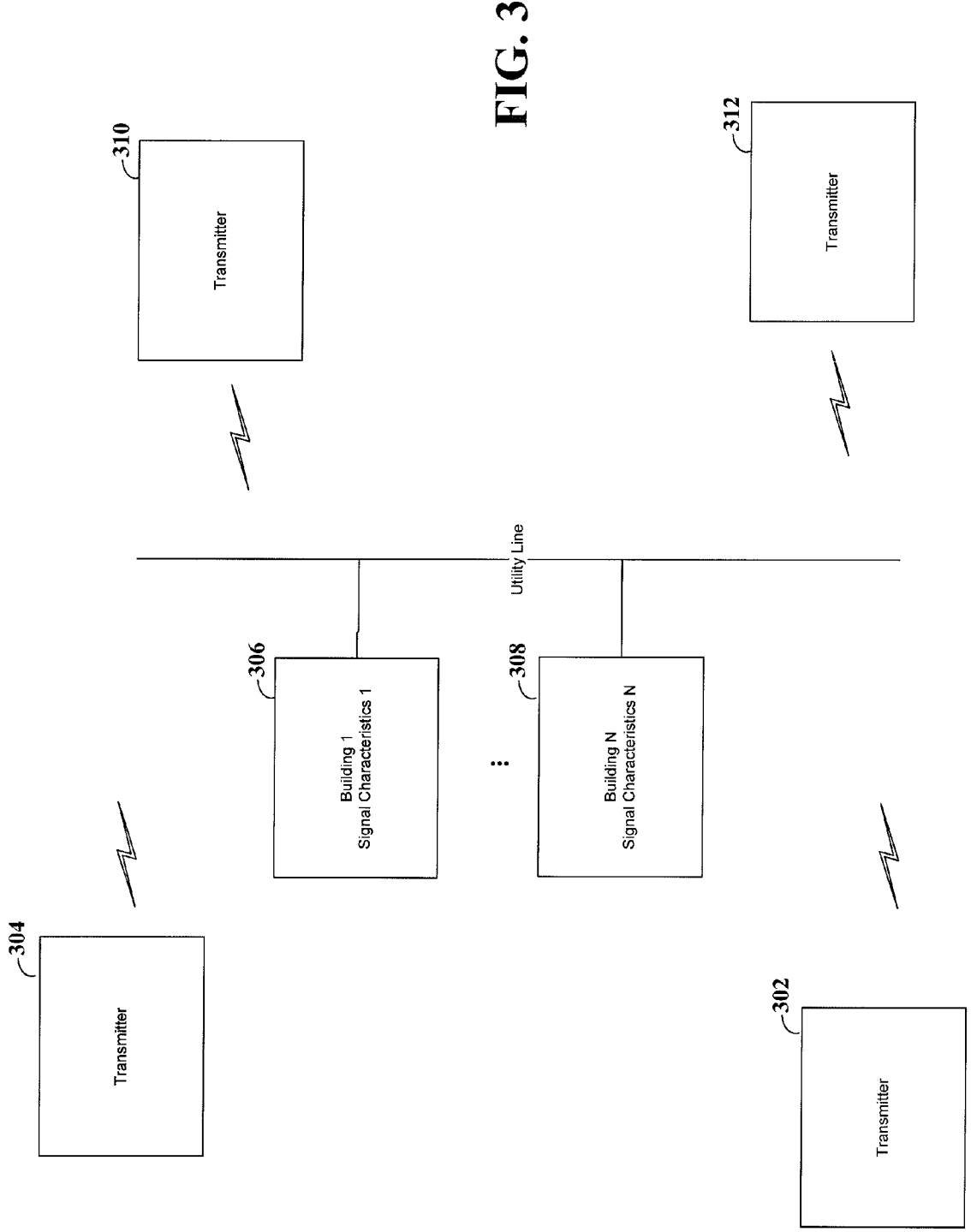
FIG. 3 shows an example transmitter arrangement, according to an example embodiment of the present invention.

FIG. 3 shows an example transmitter arrangement, according to an example embodiment of the present invention. The figure shows transmitters 302, 304, 310 and 312 as well as buildings 306 and 308. The transmitters send RF signals that are subsequently carried on the utility line connected to the buildings. Building 306 receives signals having signal characteristics 1, while building 308 receives signals having signal characteristics N. At least some of the differences between the signal characteristics are due to the fact that the buildings are in different locations. For example, because RF signals travel at a finite speed, any additional distance from transmitter 302 and the buildings results in additional delay of the receipt of the RF signal from transmitter 302. Accordingly, the various techniques discussed herein can be used to ascertain the location of the buildings relative to one or more of the transmitters.

Figure 4:
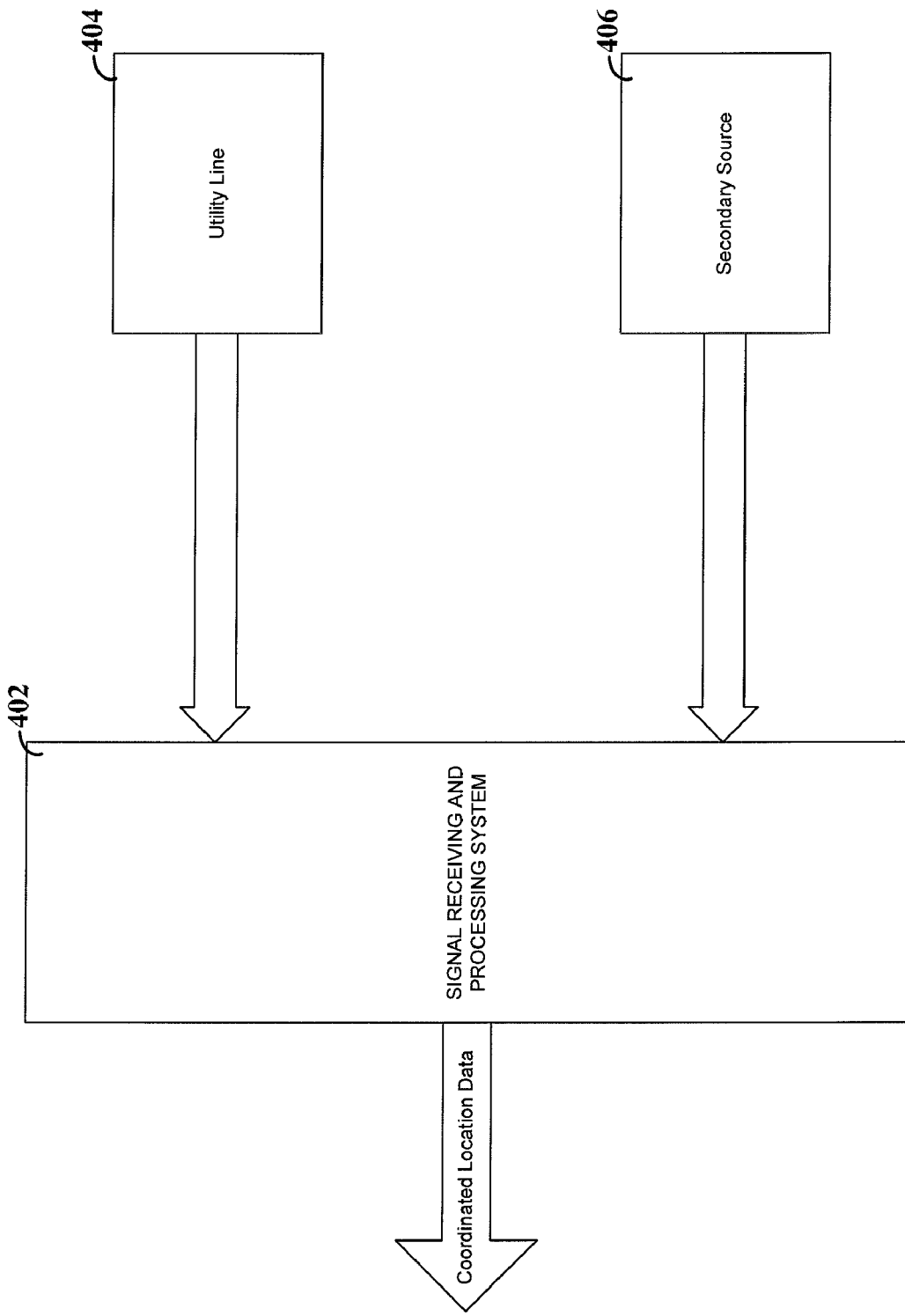
FIG. 4 shows a block diagram of a location determination system, according to an example embodiment of the present invention.

FIG. 4 shows a block diagram of a location determination system, according to an example embodiment of the present invention. FIG. 4 includes a signal receiving and processing system 402 for receiving and processing signals from a utility line 404, according to the various implementations discussed herein. In addition to receiving signals from utility line 404, processing system 402 receives signals from secondary source 406. These received signals are used to generate coordinated location data.

Secondary source 406 can be useful for a number of different applications. In one instance, secondary source 406 can serve as a verification of the location information derived from utility line 404. In another instance, secondary source can provide more specific information, such as a precise location within a structure. Another potential use for secondary source 406 includes an alternate/backup location determination. For example, the secondary source could be received using an RF receiver that receives RF signals on a local antenna (e.g., a conventional GPS or LORAN receiver). The secondary source can be used when location dependent signals are not available on the utility line. Alternately, the signals on the utility line can be used when the secondary source is not available.

The secondary source 406 can be any number of different data sources. In a specific instance, the secondary source includes one or more radio-frequency-identification (RFID) transmitters. In another instance, secondary source 406 can be a processor communicating using an Ethernet-based signal, such as an Internet connection (wireless or direct). In a specific example, secondary source 406 can determine location information from detecting one or more wireless access points. For example, wireless access points are often named according to their location and distances from the access points can be approximated using the signal strength of the access point. Various other communication methods and sources are also possible.

Figure 5:
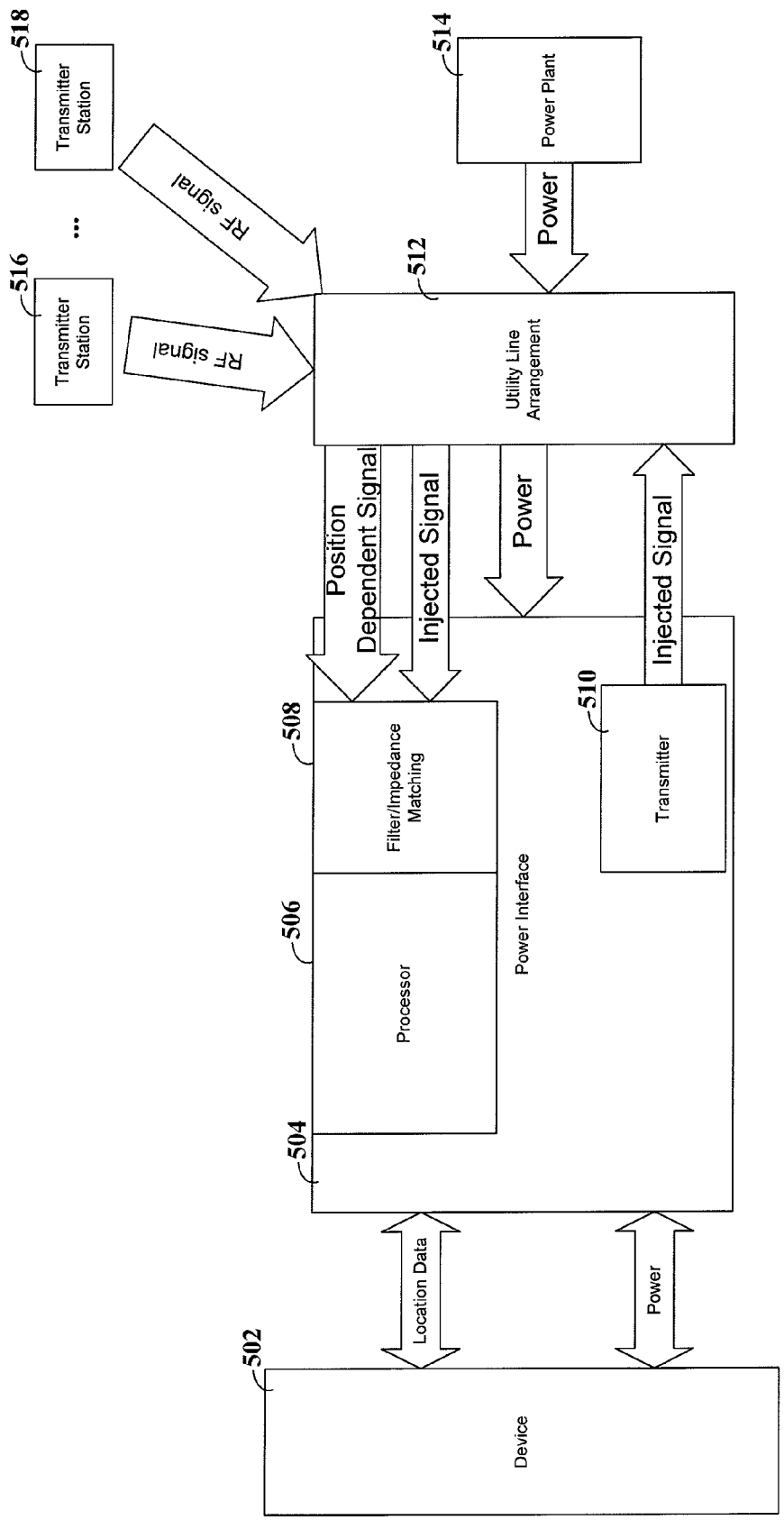
FIG. 5 shows a system for deriving location information, according to another example embodiment of the present invention.

FIG. 5 shows a system for deriving location information, according to another example embodiment of the present invention. Power interface 504 is communicatively coupled to both utility line 512 and device 502. Power interface includes processor 506, filter/impedance matching block 508 and (optionally) transmitter 510.

Device 502 receives power from utility line 512 and ultimately from a power source, such as power plant 514. In some instances power interface 504 functions as a power conversions unit (e.g., an alternating current to direct current converter) for device 502. In other instances power interface 504 simply provides electrical conductivity between device 502 and utility line arrangement 512 (e.g., a power cord). Moreover, power interface 504 can be implemented either externally or internally with respect to device 502.

In addition to supplying power, power interface 504 is capable of receiving RF signals that are from transmitters 516 and 518 and that are carried on utility line 512. To facilitate the reception of RF signals, filter block 508 functions to remove unwanted noise and signals that are also carried on utility line arrangement 512. The filtered signal can then be more easily used by processor 506. Filtering can be accomplished by various methods and combinations thereof. A few examples include, notch or band filters, analog gain stages, feedback loop correction techniques and digital signal processing filter (e.g., fast-Fourier-transform methods). Processor 506 generates location data that is responsive to characteristics of the position dependent signal. Power interface 504 sends the location data to device 502.

In one embodiment of the present invention, transmitter 510 is used by power interface 504 to provide additional location specific data. Transmitter 510 injects a (mapping) signal onto utility line arrangement 512. In a specific embodiment, the transmitter 510 injects a signal onto the wiring of a building through an outlet or similar interface. The injected signal is reflected by impedance mismatches in the wiring of the building. The reflected signal is received by power interface 504 and processor 506 generates additional location data. Power interface 504 sends the additional location data to device 502. The reflected signal can be used to determine the specific outlet that power interface 504 is coupled to because each outlet is connected to a different portion of the building wiring resulting in a different reflected signal. Accordingly, the reflected (mapping) signal can be used as a "finger print" of each outlet. In one instance, device 502 or power interface 504 stores a table or database of outlet and corresponding injected signal characteristics. This can be particularly useful for mapping different outlets within one or more buildings and for determining the specific location within a building. For example, when power interface 504 determines via the RF signal that it is in a new building, power interface 504 can request location information from a user to identify the specific outlet, or simply add a new entry into the table. Alternately, if power interface 504 determines via the RF signal that it is in a building that corresponds to one or more outlets in the stored table, the reflected/injected signal can be compared against the table to find a corresponding outlet. If no corresponding outlet is found, power interface 504 can request location information from a user to identify the specific outlet.

Figure 6:
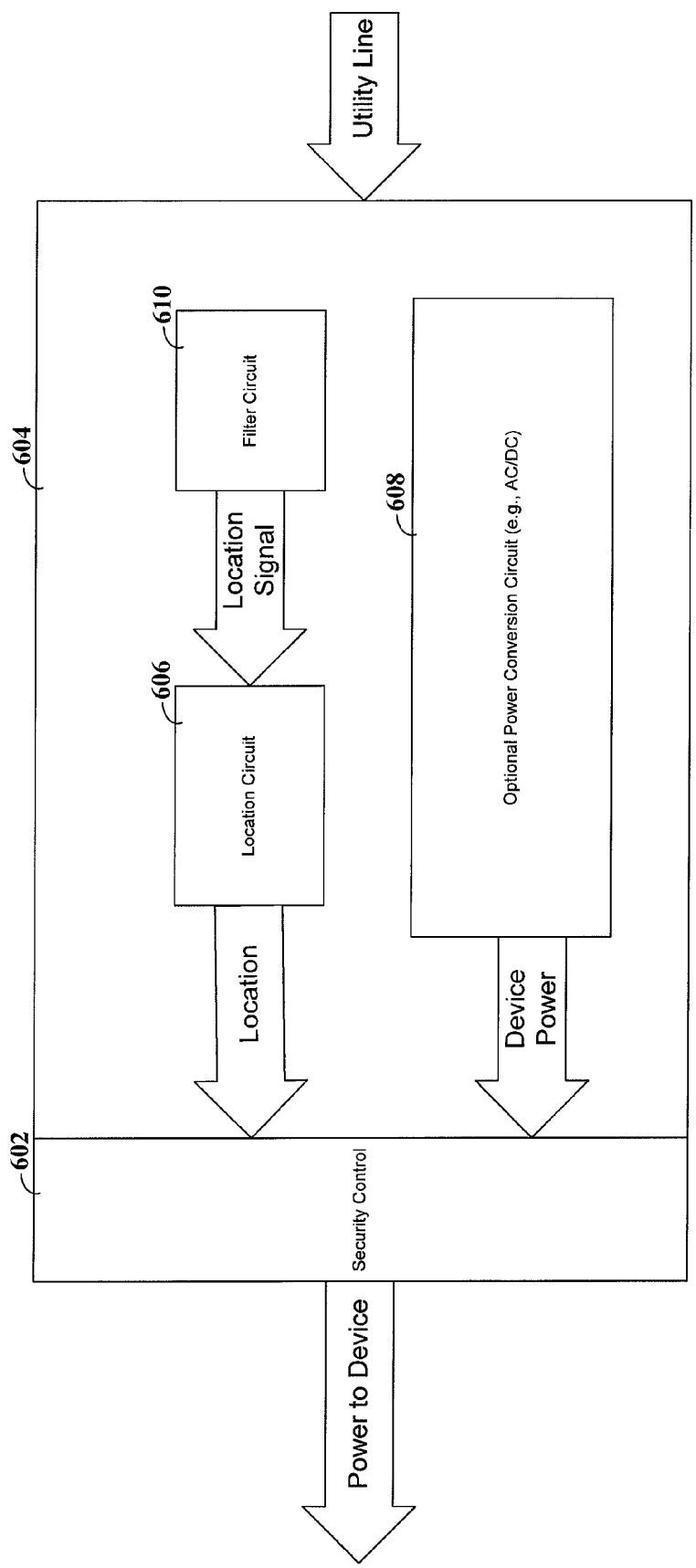
FIG. 6 shows a power interface for security control, according to an example embodiment of the present invention.

FIG. 6 shows a power interface for security control, according to an example embodiment of the present invention. Power interface device 604 includes filter circuit 610, location circuit 606, optional power conversion circuit 608 and security control 602. Security control 602 receives location information from location circuit 606. Security control 602 uses the location information to selectively provide power to an attached device. For example, security control 602 can compare the location information to a table or database of authorized locations and in response provide power to an attached device. This is particularly useful for portable devices that contain sensitive material, such as laptops. In one instance, the power interface is integrated into the attached device (e.g., on the motherboard of a computer). In another instance, the power interface can be an external power supply or power connection/plug. For additional security the external power interface can be configured to only work with a specific device or group of devices. For example, security control 602 can be configured to require that the attached device send an appropriate authorization code prior to providing power to the attached device. In addition to selectively controlling power to the device, the power interface can also send the location information to the device for further use.

Figure 7:
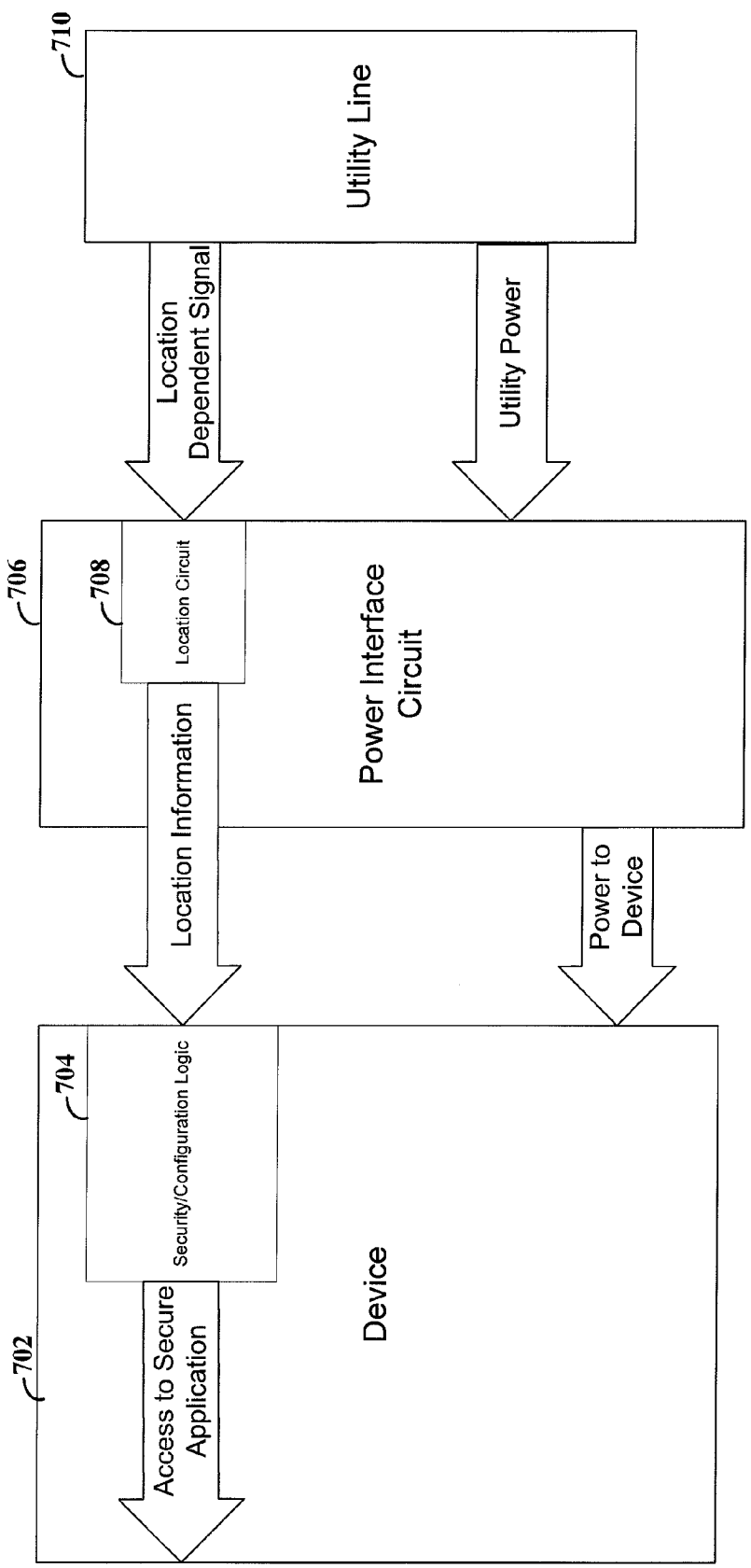
FIG. 7 shows a system for controlling access to secure applications, according to an example embodiment of the present invention.

FIG. 7 shows a system for controlling access to secure applications, according to an example embodiment of the present invention. Power interface circuit 706 uses location circuit 708 to derive location information from signals carried on utility line 710 and sends the location information to device 702. Device 702 uses security control logic 704 and the location information to control access to secure application(s). Thus, device 702 is powered regardless of the location information; however, the access to the secure application can be controlled. This can be particularly useful for site-licensing of applications or functionality. For example, many software applications have restrictions on use. Power interface circuit 706 can limit the application use to on-site uses, for applications that are licensed only for business uses. Moreover, the location information can be used for controlling access to multiple applications.

Figure 8:
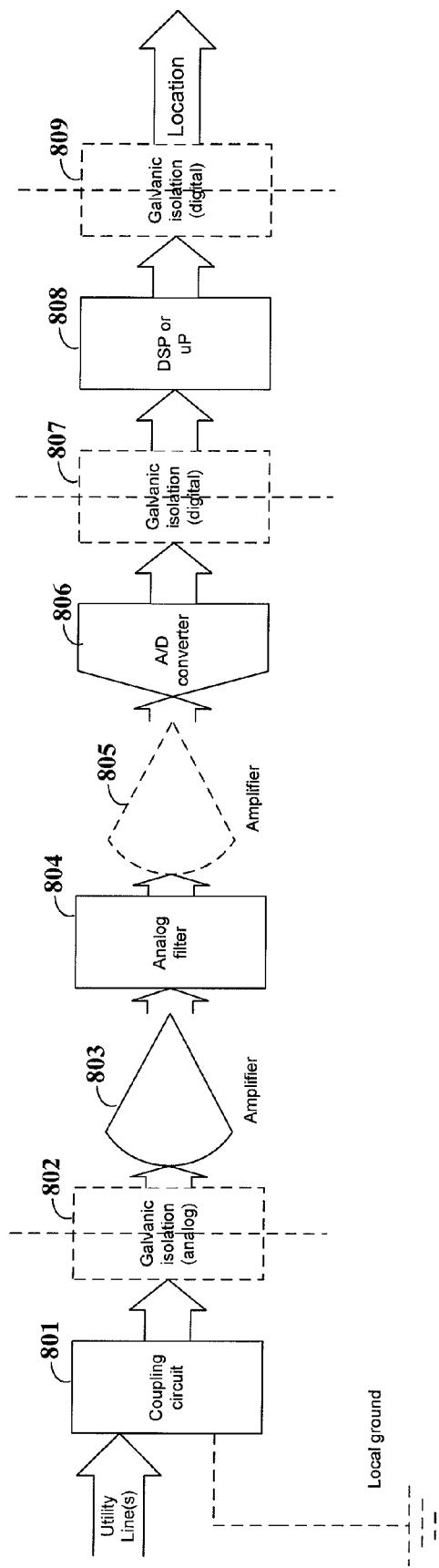
FIG. 8 shows a block diagram of a specific implementation of a location circuit that includes a filter circuit, according to an example embodiment of the present invention.

FIG. 8 shows a block diagram of a specific implementation of a location circuit that includes a filter circuit, according to an example embodiment of the present invention. The block diagram shows blocks 801 through 809, which can be implemented to facilitate the reception and processing of RF signals carried on a utility line. Blocks 802, 807 and 809 represent electrical isolation circuits. Blocks 803 and 805 represent amplifier circuits. Block 801 represents a coupling circuit to provide an interface to the utility line. Block 804 represents an analog filter. Block 806 represents an ADC. Block 808 represents a DSP or similar processing unit.

In one instance, block 801 is implemented using a coupling circuit that is a single-pole RC high-pass filter (HPF). Such a filter serves both as a connection to the utility line and to remove low frequency signals. Other suitable coupling methods can also be used including coupling via a transformer.

Galvanic isolation blocks 802, 807 and 809 are optionally implemented to provide isolation from direct current. Such isolation blocks are particularly useful for applications in which the utility line is capable of providing large voltages and currents (e.g., power lines).

Amplifiers 803 and 805 serve to increase the amplitude of signals carried on utility lines. Such amplification facilitates the detection and processing of weak signals and can be particularly useful for processing signals generated due to the utility line acting as an antenna for RF signals. The number and strength of amplifiers implemented can be varied based upon the received signals and the specific application.

Filtering of unwanted noise and other signals can be accomplished using one or more filters including analog and/or digital filtering. In a specific instance, analog filter 804 provides initial filtering before the signal is amplified by amplifier 805. Analog filter 804 can be configured using a number of different filtering circuits, including band-pass, notch, low-pass and high-pass filters. In one instance, analog filter 804 can serve as an anti-aliasing low-pass filter for ADC 806. ADC 806 converts the signal from amplifier 805 to a digital signal. In one instance, the ADC further filters the signal during the conversion from analog to digital.

DSP or processor 808 determines location information from characteristics of the received signal. In one instance, block 808 can be implemented using a dedicated DSP chip. Some modern DSP chips have a built-in A/D converter in which case, blocks 806 and 808 can reside on the same chip. In another instance, block 808 can be implemented using a general purpose processor, such as the CPU of a computer. Block 808 can be configured to produce a number of different outputs, including geographic indicators (e.g., latitude and longitude) and location based signatures.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, such changes may include the use of RF signals from FM/AM radio broadcasts or similar sources. Such modifications and changes do not depart from the true spirit and scope of the present invention, which is set forth in the following claims.

What is claimed is:

1. A system for providing location information in response to a utility-line arrangement having conductors carrying power to sets of power terminals in different buildings on behalf of a utility entity, for the system comprising:
   a receiver circuit communicatively coupled to receive low-frequency signals in a frequency range less than 1000 MHz from at least one of the power carrying conductors of the utility-line arrangement, the low-frequency signals representing broadcast radio signals provided by an external signal broadcasting source;
   a signal-processing logic circuit, communicatively coupled and responsive to the at least one of the power carrying conductors of the utility-line arrangement, to derive location information of the receiver circuit from characteristics of the low-frequency signals, the characteristics being indicative of a location of the receiver circuit relative to said one or more remote transmitters; and
   a transmitter arranged to inject a local signal on the utility-line arrangement, wherein the signal-processing logic circuit derives location information responsive to a reflection of the local signal, wherein the receiver circuit is coupled to the utility-line arrangement via a power outlet located within a structure and location information responsive to a reflection of the local signal provides an indication of a location of the power outlet within the structure.

2. The system of claim 1, wherein the broadcast radio signals are part of a Long Range Navigation (LORAN) communication, wherein the receiver circuit includes a filter configured to pass LORAN radio signals by attenuating other signals, and wherein the characteristics of the low-frequency signals include data representative of the LORAN radio signals and different spatio-temporal data relative to a unique location in one of the different buildings.

3. A system for providing location information in response to a utility-line arrangement propagating low-frequency signals in a frequency range significantly less than 1000 MHz that represent a broadcast (RF) communication originating from one or more remote transmitters, the system comprising:
   a receiver circuit communicatively coupled to receive the low-frequency signals from the utility-line arrangement;
   a signal-processing logic circuit, communicatively coupled and responsive to the utility-line arrangement, to derive location information from characteristics of the signals, the characteristics being indicative of a location of the receiver circuit relative to said one or more remote transmitters, wherein the signal-processing logic circuit derives location information by one or more of range, angle, time of arrival, time difference of arrival and signal strength, wherein the utility-line arrangement acts as an antenna for the receiver circuit which is antenna-coupled to receive the low-frequency signals from the utility-line arrangement; and
   a transmitter arranged to inject a local signal on the utility-line arrangement, wherein the signal-processing logic circuit derives location information responsive to a reflection of the local signal, wherein the receiver circuit is coupled to the utility-line arrangement via a power outlet located within a structure and location information responsive to a reflection of the local signal provides an indication of a location of the power outlet within the structure.

4. The system of claim 1, wherein the receiver circuit is coupled to the utility-line arrangement via a power outlet located within a structure and the location information is indicative of a latitude and longitude corresponding to the structure.

5. The system of claim 1, further including a tracking circuit arranged to provide, to a remote device, at least one of the location information or timing information.

6. The system of claim 1, wherein the receiver circuit includes a filter circuit to remove noise from the utility-line arrangement using a low-pass filter circuit as an anti-aliasing filter for an analog to digital converter.

7. The system of claim 1, further including a transmitter arranged to inject a local signal on the utility-line arrangement, wherein the signal-processing logic circuit derives location information responsive to a reflection of the local signal.

8. A system for providing location information in response to a utility-line arrangement propagating low-frequency signals in a frequency range less than 1000 MHz that represent a wireless radio-frequency (RF) communication originating from one or more remote transmitters, the system comprising:
   a receiver circuit communicatively coupled to receive the low-frequency signals from the utility-line arrangement;
   a signal-processing logic circuit, communicatively coupled and responsive to the utility-line arrangement, to derive location information from characteristics of the signals, the characteristics being indicative of a location of the receiver circuit relative to said one or more remote transmitters; and
   a transmitter arranged to inject a local signal on the utility-line arrangement, wherein the signal-processing logic circuit derives location information responsive to a reflection of the local signal, wherein the receiver circuit is coupled to the utility-line arrangement via a power outlet located within a structure and location information responsive to a reflection of the local signal provides an indication of a location of the power outlet within the structure.

9. The system of claim 1, further including a control circuit used to limit access to a device connected to the system in response to the location information.

10. The system of claim 9, further including a power circuit to provide power from the utility-line arrangement to the device, wherein the control circuit limits access by controlling the power provided to the device.

11. The system of claim 9, wherein limiting access to the device includes restricting access to one or more software applications.

12. The system of claim 9, wherein the system is arranged to send the location information to a remote device and to limit access to the device until the remote device indicates that location information is acceptable.

13. The system of claim 1, further including a processor that implements a software application that determines whether to provide the location information in response to a query from a remote server over the Internet.

14. A method for providing location information in response to a utility-line arrangement acting as a receiving antenna for receiving and then propagating low-frequency signals in a frequency range less than 1000 MHz and that include a wireless radio-frequency (RF) communication originating from one or more remote transmitters, the method comprising:
receiving the low-frequency signals at a receiving location by communicatively coupling to the utility-line arrangement; and
deriving the receiving location from characteristics of the signals, the characteristics being indicative of the receiving location relative to said one or more remote transmitters without use of a transmitter that receives the wireless RF communication and retransmits a wireless RF communication onto the utility line.

15. The method of claim 14, wherein the wireless RF communication is a Long Range Navigation (LORAN) communication.

16. The method of claim 14, wherein the step of receiving the signals is via a power outlet that is communicatively coupled to the utility line arrangement and that is located within a structure.

17. The method of claim 16, wherein the location information is indicative of latitude and longitude coordinates corresponding to the structure.

18. The method of claim 16, wherein the location information corresponds to a street address of the structure.

19. The method of claim 18, wherein the street address is used by emergency services in connection with a telephone call.

20. A system for providing location information in response to a utility-line arrangement that functions as an antenna that wirelessly receives and then propagates low-frequency signals in a frequency range less than 1000 MHz and that include a wireless radio-frequency (RF) communication originating from one or more remote transmitters, the system comprising:
a receiver circuit communicatively coupled to receive the low-frequency signals from the utility-line arrangement; and
a signal-processing logic circuit responsive to the utility-line arrangement and configured to:
derive location information from characteristics of the signals, the characteristics being indicative of a location of the receiver circuit relative to said one or more remote transmitters, and
derive location information from an input other than the utility-line arrangement without use of a transmitter that receives the wireless RF communication and retransmits a wireless RF communication onto the utility line.

21. The system of claim 20, wherein the signal-processing logic circuit uses a Global Positioning System (GPS) signal from the input to derive location information.

22. The system of claim 20, wherein the signal-processing logic circuit uses a Radio Frequency Identification (RFID) signal from the input to derive location information.

23. The system of claim 20, wherein the input is a wireless Ethernet receiver that provides location information derived from a wireless access point and the system is integrated into a motherboard of a computer.

24. The system of claim 20, wherein the receiver circuit is coupled to the utility-line arrangement via a power outlet located within a structure and the location information is indicative of a latitude and longitude corresponding to the structure.

25. The system of claim 24, wherein information indicative of the location of the power outlet within the structure is provided using the input.

26. An apparatus for providing location information in response to a utility-line arrangement propagating low-frequency signals in a frequency range less than 1000 MHz that represent a wireless radio-frequency (RF) communication originating from one or more remote transmitters, the apparatus comprising:
a receiver circuit communicatively coupled to receive the low-frequency signals from the utility-line arrangement;
a signal-processing logic circuit, communicatively coupled and responsive to the utility-line arrangement, to derive location information from characteristics of the signals, the characteristics being indicative of a location of the receiver circuit relative to said one or more remote transmitters; and wherein the receiver circuit is coupled to the utility-line arrangement via a power outlet located within a structure, and is responsive to another source of location information as an indication of a location of the power outlet within the structure, wherein the signal-processing logic circuit is configured to drive the location information without use of a transmitter that receives the wireless RF communication and retransmits a wireless RF communication onto the utility line.

27. The apparatus of claim 26, further including a control circuit configured to limit access to a device connected to the system in response to the location information.

28. The apparatus of claim 27, further including a power circuit to provide power from the utility-line arrangement to the device, wherein the control circuit limits access by controlling the power provided to the device.

29. A system for providing location information in response to a utility-line arrangement acting as a radio frequency (RF) receiving antenna for a wireless RF communication originating from one or more remote transmitters and transmitted as low frequency signals at frequency less than 1000 MHz, the utility-line arrangement propagating the low-frequency signals, the system comprising:
a receiver circuit communicatively coupled to receive the low-frequency signals from the utility-line arrangement; and
a signal-processing logic circuit, communicatively coupled and responsive to the utility-line arrangement, to derive location information from characteristics of the signals without use of a transmitter that receives the wireless RF communication and retransmits a wireless RF communication onto the utility line, the characteristics being indicative of a location of the receiver circuit relative to said one or more remote transmitters.

* * * * *